United States Patent [19]
Arai

[11] Patent Number: 5,165,622
[45] Date of Patent: Nov. 24, 1992

[54] MAGNETIC TAPE LOADING APPARATUS

[75] Inventor: Mitsuhiro Arai, Yokohama, Japan

[73] Assignee: Victor Company of Japan, Yokohama, Japan

[21] Appl. No.: 526,669

[22] Filed: May 22, 1990

[30] Foreign Application Priority Data

May 23, 1989 [JP] Japan ................................ 1-129054

[51] Int. Cl.⁵ .................... G11B 15/665; G11B 15/43; G11B 15/18
[52] U.S. Cl. ...................................... 242/191; 360/137
[58] Field of Search ............. 242/191; 360/137, 73.01, 360/74.5

[56] References Cited

U.S. PATENT DOCUMENTS

| | | | |
|---|---|---|---|
| 4,644,436 | 2/1987 | Unno | 360/137 |
| 4,989,112 | 1/1991 | Hamoda | 360/137 |
| 4,996,611 | 2/1991 | Ito | 360/137 |

FOREIGN PATENT DOCUMENTS

| | | |
|---|---|---|
| 0282340 | 9/1988 | European Pat. Off. . |
| 0316156 | 5/1989 | European Pat. Off. . |
| 2730134 | 2/1978 | Fed. Rep. of Germany . |
| 3318324 | 11/1983 | Fed. Rep. of Germany . |
| 58-32259 | 2/1983 | Japan . |
| 59-84365 | 5/1984 | Japan . |
| 1555059 | 11/1979 | United Kingdom . |
| 2139802 | 11/1984 | United Kingdom . |
| 2122800 | 12/1985 | United Kingdom . |

Primary Examiner—Daniel P. Stodola
Assistant Examiner—John Q. Nguyen
Attorney, Agent, or Firm—Pollock, VandeSande & Priddy

[57] ABSTRACT

A cassette discriminating apparatus incorporated in a magnetic recorder for discriminating between a first cassette and a second cassette. The discriminating apparatus includes a supply reel drive for rotating the supply reel of the first cassette or of the second cassette, a take-up reel drive for rotating the take-up reel of the first cassette or of the second cassette, a first sensor for detecting the number of revolutions of each of the supply reel drive and the take-up reel drive, a second sensor for detecting the number of revolutions of a capstan, an arithmetic unit for computing the sum of a first square of the number of revolutions of the capstan per one revolution of the supply reel drive and a second square of the number of revolutions of the capstan per one revolution of the take-up reel drive, based on the outputs from the first and second sensors, respectively, a comparator for comparing the output from the arithmetic unit with a predetermined reference value to discriminate between the first cassette and the second cassette, and a tension control unit for controlling the tape tension according to the result of the discrimination by the comparator.

2 Claims, 3 Drawing Sheets

MAGNETIC TAPE LOADING APPARATUS

BACKGROUND OF THE INVENTION

The present invention relates to a cassette discriminating apparatus suitable for use in magnetic recorders such as VHS video cassette recorders ("VHS" is the trademark of Victor Company of Japan, Ltd.).

The VHS video cassette recorders can be used with two types of cassettes. The cassettes of a first type include T-60, T-20, T-168, T-120, T-140, T-100 and T-80 cassettes whose supply and take-up reels have substantially the same hub diameter. These cassettes are used for both home video decks and so-called "camcorders" (integrated video camera and recorders). The cassettes of a second type include a TC-20 cassette, for example, and have a supply reel whose hub is larger in diameter than the hub of a take-up reel. The cassettes of the second type are used mainly for the camcorders.

The cassette of the second type is smaller (about one-third) in size than the cassette of the first type and, therefore, the use of the cassettes of the second type makes it possible to provide an extremely compact and lightweight video cassette recorder. Those video cassette recorders which are constructed for exclusive use with the second, small cassettes are unable to load the first, large cassette. However, it is possible to load the second, small cassette on a video cassette recorder which is basically constructed to load the first, large cassette. To this end, a full-size adaptor having the same size as the first cassette is prepared for permitting attachment of the second cassette. With a second, small cassette mounted thereon, the full-size adaptor is loaded on the standard video cassette recorder.

Since the adaptor containing the second, small cassette has the same size as the first, large cassette and is loaded in the same manner as the first, large cassette, the conventional video cassette recorders are unable to discriminate the cassette loaded thereon. With this impossibility of cassette discrimination, the tension on the magnetic tape is substantially uncontrolled. Consequently, the magnetic tape is likely to be damaged when used with the conventional video cassette recorder.

SUMMARY OF THE INVENTION

With the foregoing drawbacks of the prior art in view, it is an object of the present invention to provide an apparatus for discriminating the type of a cassette now loaded on a magnetic recorder, such as a video cassette recorder, so as to control the tape tension appropriately according to the loaded cassette.

In brief, the present invention relates to an improved magnetic recorder of the type wherein a first cassette, and an adaptor having the same size as the first cassette and holding therein a second cassette smaller in size than the first cassette are selectively loaded on the magnetic recorder, the first cassette including a supply reel and a take-up reel which, respectively, wind and unwind a magnetic tape on and around their hubs, the hubs having the same diameter, the second cassette including a supply reel and a take-up reel which, respectively, wind and unwind a magnetic tape on and around their hubs, the hubs of the second cassette having different diameters, wherein the improvement comprises an apparatus for discriminating between the first cassette and the second cassette.

The discriminating apparatus includes a supply reel drive, i.e. a drive supply reel, for rotating the supply reel of the first cassette or the supply reel of the second cassette a take-up reel drive, i.e. a drive take-up reel, for rotating the take-up reel of the first cassette or the take-up reel of the second cassette, a capstan rotatable for driving the magnetic tape within the first cassette or the second cassette, a first sensor for detecting the number of revolutions of the drive supply reel and the number of revolutions of the drive take-up reel, a second sensor for detecting the number of revolutions of the capstan, an arithmetic unit for computing the sum of a first square of the number of revolutions of the capstan per one revolution of the drive supply reel and a second square of the number of revolutions of the capstan per one revolution of the drive take-up reel, based on the outputs from the first and second sensors, respectively, a comparator for comparing the output from the arithmetic unit with a predetermined reference value to discriminate between the first cassette and the second cassette, and means for controlling a tension on the magnetic tape according to the result of the discrimination by the comparator.

As described above, the supply and take-up reels of the first cassette have the same hub diameter, while the supply and take-up reels of the second cassette have different hub diameters. The second cassette which is smaller in size than the first cassette and is held in the adaptor is loaded on the magnetic recorder in the same manner as the first cassette.

The supply reel of the first cassette or of the adaptor and the take-up reel of the first cassette or of the adaptor are driven respectively by the drive supply reel and the drive take-up reel of the magnetic recorder. While the magnetic tape is being driven at a predetermined speed by means of the capstan, the number of revolutions of the capstan per one revolution of the drive supply reel and the number of revolutions of the capstan per one revolution of the drive take-up reel are detected in terms of the number of pulses produced by a frequency generator associated with the capstan.

The detected outputs are squared, respectively, and then added together. Regarding the first cassette, the sum of the squared outputs takes various values depending on the types of the cassette (T-60, T-160, etc.). However, in the individual type, the sum is constant throughout the winding operation regardless of the instantaneous winding position of the magnetic tape. On the other hand, the sum of the squared values on the second cassette varies depending on the winding position of the magnetic tape, in such a manner as to gradually increase with an increase in the amount of tape wound on the take-up reel and becomes maximum at the end of the winding. However, the sum at the end of the winding of the second cassette is smaller than the sum obtained for the first cassette.

If an intermediate value between the sum obtained from the first cassette and the sum obtained at the end of winding of the second cassette is set as the reference value, the result of a comparison of the largeness between the sum and the reference value will indicate the type of the cassette being loaded on the magnetic recorder. The result of the comparison is outputted from the comparator to the tension control unit which in turn regulates the speed of a capstan motor and a loading motor for controlling the tension on the magnetic tape according to the cassette being loaded on the video cassette recorder.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENT

Figure 1:
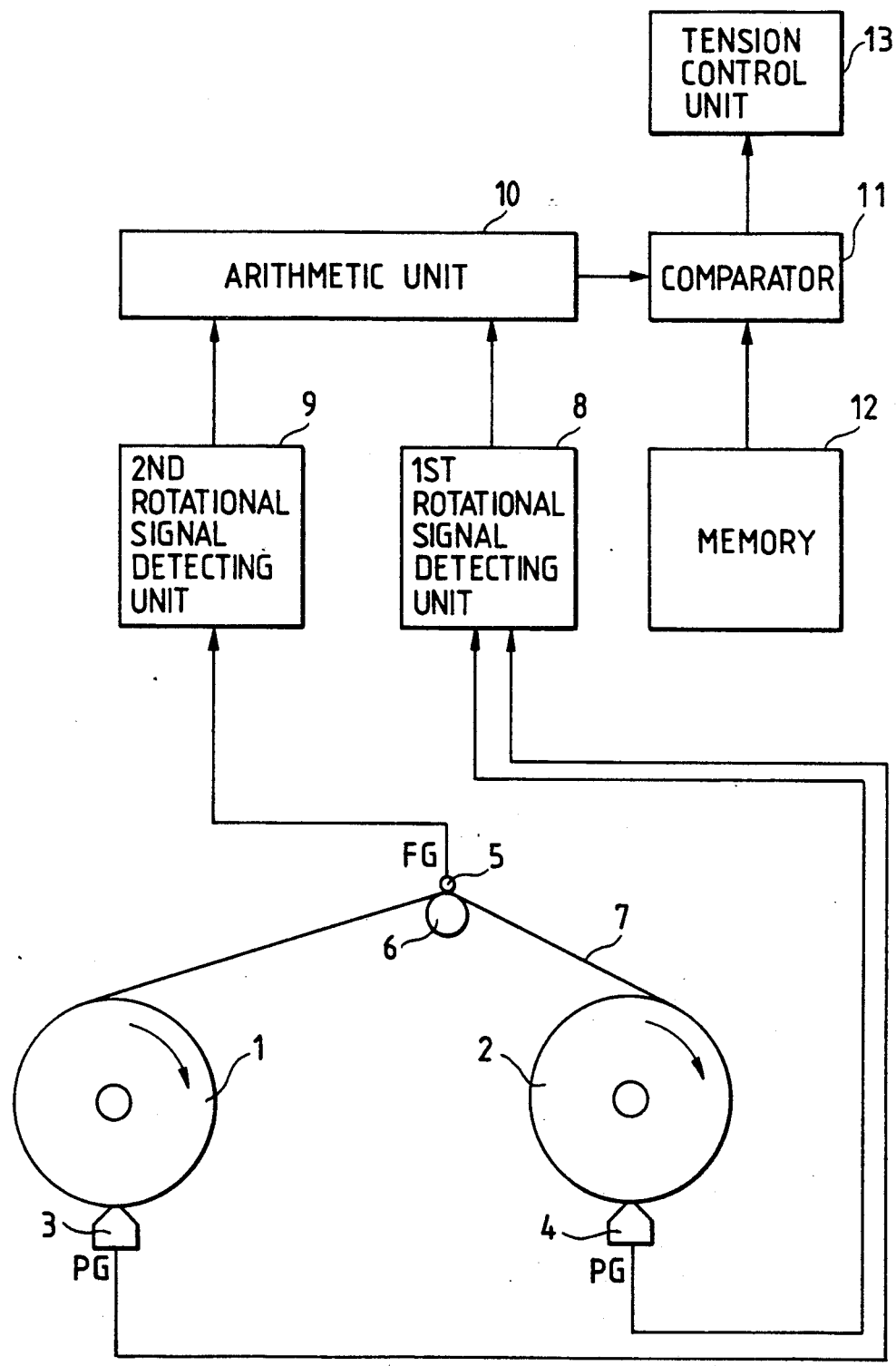
FIG. 1 is a block diagram of a cassette discriminating apparatus according to the present invention.

As shown in FIG. 1, a cassette discriminating apparatus incorporated in a magnetic recorder, such as a video cassette recorder, includes a drive supply reel 1 and a drive take-up reel 2 which, respectively, engage a supply reel and a take-up reel of a first cassette, not shown, to rotate the supply reel and the take-up reel. Two rotation sensors 3, 4 are associated with the drive supply reel 1 (supply reel drive) and the drive take-up reel 2 (take-up drive reel) for detecting pulses (hereinafter referred to as "PG pulses") generated by pulse generators, not shown, attached to the respective drive supply and take-up reels 1, 2. A capstan 5 and a pinch roller 6 cooperate together to travel a magnetic tape 7 of the first cassette at a predetermined speed.

A first rotational signal detecting unit 8 is connected with the rotation sensors 3, 4 for detecting the number of revolutions of the drive supply reel 1 and the number of revolutions of the take-up reel 2 based on the outputs from the respective rotation sensors 3, 4. A second rotational signal detecting unit 9 is associated with the capstan 5 for detecting the number of pulses (hereinafter referred to as "FG pulses") generated by a frequency generator, not shown, attached to the capstan 5. The first and second rotational signal detecting units 8, 9 are connected with an arithmetic unit 10. The arithmetic unit 10 is constructed to first detect the number of FG pulses of the capstan received from the frequency generator while the drive supply reel 1 completes its one cycle of revolution, and also the number of FG pulses of the capstan received from the frequency generator while the drive take-up reel 2 completes its one cycle of revolution, then calculate a square of the thus obtained FG pulse number per one revolution of the drive supply reel 1 and a square of the thus obtained FG pulse number per one revolution of the drive take-up reel 2, and finally calculate the sum of the squared FG pulse numbers. A comparator 11 is connected with the arithmetic unit 10 and a memory 12 for comparing the output from the arithmetic unit 10 with a reference value stored in the memory 12. The result of comparison by the comparator 11 is outputted to a tension control unit 13 which in turn regulates the speed of a capstan motor 14 (FIG. 3) and the speed of a loading motor 15 (FIG. 3) to thereby control the tension on the magnetic tape 7 according to the cassette being loaded on the video cassette recorder.

Figure 2:
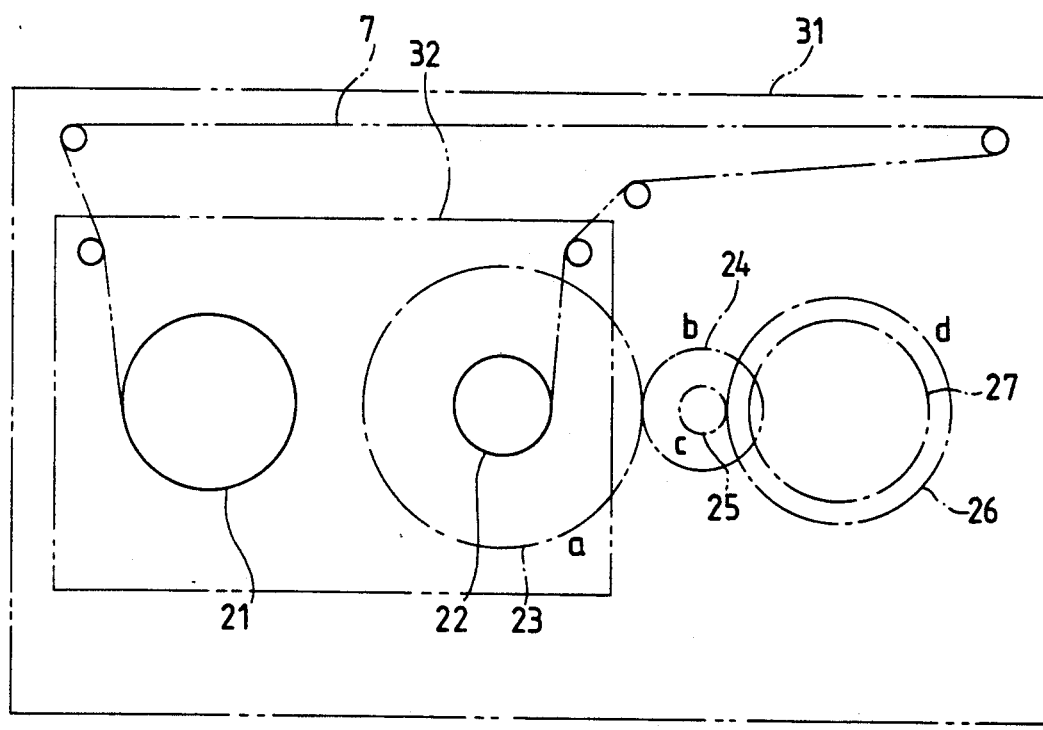
FIG. 2 is a plan view of an adaptor in which a second cassette is mounted.

FIG. 2 schematically illustrates a second cassette 32 mounted in an adaptor 31. In this figure, 22 is a hub of a take-up reel and 21 is a hub of a supply reel of the second cassette 32. The hub 21 has an outside diameter which is same as the outside diameter of the hub of the supply reel or the take-up reel of the first cassette, the outside diameter being 26 mm, for example. On the other hand, the hub 22 has an outside diameter of 15 mm, for example, which is smaller than the outside diameter of the hub 21.

A train of gears 23–26 are disposed in the adaptor 31 for rotating the hub 22 of the take-up reel of the second cassette 32. The gears 23–26 have the same ratio such as 0.5 and have respective pitch diameters a, b, c, and d. The gear 23 has the same axis of rotation as the hub 22. Like-wise, the gears 24 and 25 have a common axis of rotation. The gear 23 meshes with the gear 24 and the gear 25 meshes with the gear 26. The gear 26 is disposed in a position where the gear 26 rotates about the axis of rotation of a hub 27 of the take-up reel of the first cassette, the take-up reel constituting a pseudo take-up reel of the adaptor 31. The adaptor 31 is of a type more specifically set forth in Japanese Utility Model Publication No. 63-34154 proposed by the present assignee and hence reference may be made to this Japanese publication when necessary.

When the second cassette 32 is received in the adaptor 31, an internal loading mechanism, not shown, of the adaptor 31 is driven to withdraw a portion of the magnetic tape 7 wound around the hubs 21, 22 of the second cassette 32, to the outside of the second cassette 32 in such a manner that a path of travel of the magnetic tape 7 is formed at least in a region in front of the adaptor 31. With the travel path thus formed, the second cassette 32 can be loaded on the video cassette recorder in the same manner as the first cassette.

After the adaptor 31 with the second cassette 32 assembled thereon, or the first cassette is loaded on the video cassette recorder, a record mode or a play mode is selected whereupon the pinch roller 6 (FIG. 1) is forced against the capstan 5 to thereby travel the magnetic tape 7 at the predetermined speed. During that time, the drive take-up reel 2 is driven by a motor, not shown, to rotate the take-up reel of the first cassette or the take-up reel of the adaptor 31 in the clockwise direction in FIG. 1, so that the magnetic tape 7 is wound around the take-up reel.

In this instance, the supply reel of the first cassette or the supply reel of the second cassette 32 (FIG. 2) is caused to rotate in the clock-wise direction as the magnetic tape 7 travels. Consequently, the drive supply reel 1 engaging the supply reel is rotated in the clockwise direction.

The pulse generators attached respectively to the drive supply reel 1 and the drive take-up reel 2 generate a predetermined number of FG pulses (for example, one pulse) per one revolution of the corresponding reels 1, 2. The FG pulses thus generated by the respective pulse generators are detected by the rotation sensors 3, 4 which in turn supply the detected FG pulse numbers to the first rotational signal detection unit 8. Each time a single revolution of the drive supply reel 1 or a single revolution of the drive take-up reel 2 is detected by the pulses received from the pulse generators, the first rotational signal detecting unit 8 outputs a detected signal to the arithmetic unit 10.

On the other hand, the frequency generator attached to the capstan 5 generates the number of FG pulses corresponding to the rotation of the capstan 5. The FG pulses thus produced are detected by the rotation signal detecting unit 9 which in turn outputs the detected signal to the arithmetic unit 10.

The arithmetic unit 10 computes the number of FG pulses Ps received from the frequency generator during a single revolution of the drive supply reel 1 and also the number of FG pulses Pt received from the frequency generator during a single revolution of the drive take-up reel. Then, the arithmetic unit 10 squares Ps and Pt and calculates the sum of Ps squared and Pt squared, i.e. $(Ps^2+Pt^2)$.

If the thickness of the magnetic tape 7 is y, the total length of the magnetic tape 7 wound between the supply reel and the take-up reel is L, the radius of the supply and take-up reels is H, the number of FG pulses generated by the frequency generator per one second is P, and the distance of travel of the magnetic tape 7 per one second is D, the following expression (1) holds for the first cassette.

$$Ps^2+Pt^2=(yL/\pi+2H^2)/(D/(2\pi P))^2 \quad (1)$$

From this expression, the sum of two squares i.e. $(Ps^2+Pt^2)$ is determined by the tape thickness y and the tape length L. In other words, the sum is constant for every type of cassette regardless of the instantaneous winding position of the magnetic tape 7.

The first cassettes are classified into two groups by the diameter of the hubs. The hubs of the cassettes of a first group have a diameter of 62 mm, while the hubs of the cassettes of a second group have a diameter of 26 mm. Not-withstanding the difference in diameter of the hubs, the supply reel and the take-up reel of every cassette have a same hub diameter. It is already known in the art to automatically discriminate the cassette of one group from the cassette of another group depending on the hub diameter, then calculate a residual length of the magnetic tape and finally display the calculated residual tape length.

In the second cassette, the hub 21 of the supply reel has a diameter of 26 mm, while the hub 22 of the take-up reel has a diameter of 15 mm. Furthermore, the hub 22 of the take-up reel is out of coaxial relation to the drive take-up reel as shown in FIG. 2. The present inventor has proven the fact that the second cassette thus constructed can be discriminated from the first cassette by using the value $Ps^2+Pt^2$, in the manner described below.

Among various types of first cassettes whose supply and take-up reels have a same hub diameter, the T-60 cassette with a larger diameter (62 mm) has a maximum tape length, while the T-20 cassette with the larger diameter has a minimum tape length. On the other hand, the T-168 cassette with a smaller hub diameter (26 mm) has a maximum tape length, while the T-80 cassette with the smaller hub diameter has a minimum tape length. Among these four extreme cassettes, a minimum value for the sum stated above is given to the T-80 cassette. This means that the T-80 cassette has a sum $Ps^2+Pt^2$ which is close to the sum of the second cassette.

In the case where the adaptor 31 is being loaded on the video cassette recorder, the supply reel of the second cassette 32 is rotated directly by the drive supply reel 1, while the take-up reel is not directly rotated by the drive take-up reel 2. More particularly, the drive take-up reel 2 rotates the gear 26 integrally coupled with the pseudo take-up reel of the adaptor 31. Rotation of the gear 26 is transmitted successively through the gear 25, the gear 24 and the gear 23 to the take-up reel of the second cassette 32.

The gears 23–26 have pitch diameters a–d of 40 mm, 17 mm, 7.5 mm and 31.5 mm, respectively, and hence the reduction ratio Z between the gear 23 and the gear 26 is obtained by the following expression (2).

$$Z=(d/c)(b/a)=1.785 \quad (2)$$

This expression indicates that one revolution of the drive take-up reel 2 causes a 1.785 revolution of the take-up reel of the second cassette 32.

Now, a sum $Ps^2+Pt^2$ for the first cassette T-80 and a sum $Ps^2+Pt^2$ for the second cassette TC-20 are calculated using specifications of the respective cassettes, in accordance with the expressions $$Ps=2\pi RsP/D, \text{ and}$$

$$Pt=2\pi RtZP/D$$

where Rs is the radius of the tape wound on the supply reel, Rt is the radius of the tape wound on the take-up reel, and Z is the reduction ratio of the take-up reel of the second cassette. Results of this calculation are shown in Table 1.

TABLE 1

| Type | Tape Length L (m) Max | Tape Length L (m) Min | Tape Thickness y (mm) | Hub Radius H (mm) | Square of Capstan FG per 1-revolution Supply Side (HEX) | Square of Capstan FG per 1-revolution Take-up Side (HEX) | Sum (HEX) | Quadrupled Sum (HEX) |
|---|---|---|---|---|---|---|---|---|
| T-80 | 168 | 165* | 0.021 –0.018* | 13.075 –12.925* | 4E1,5C90 | BB,9E2D | 59C,FABD | 1673,EAF4 |
| Threshold TC-20 |  |  |  |  |  |  | 59C,0000 | 1670,0000 |
| Leading End | 45.7* | 43.7 | 0.020* | Supply 13.05* –12.95 | 206,027F | 3F,2C71 | 2CF,4B88 | B3D,2E20 |
| TC-20 Trailing End | 45.7* | 43.7 | –0.017 | Take-up 7.5* –7.35 | DF,43AF | 185,EB41 | 599,A249 | 1666,8924 |

In Table 1, a square of the capstan FG pulses on the take-up side is not a value taken on the take-up reel of the second cassette 32, but is a value taken on the drive take-up reel 2. In other words, the squares on the take-up side of the TC-20 cassette are $1.785^2$ times the squares of the number of capstan FG pulses per one revolution of the hub 22 of take-up reel.

The sum taken on the first cassette T-80 is minimum when the tape length L=165 m, the tape thickness y=0.018 mm and the hub radius H=12.925 mm, as marked with "*" shown in Table 1. The sum is 59C, FABD(HEX) and a quadruple of the sum is equal to 1673, EAF4(HEX).

In the case of the second cassette TC-20, the sum is maximum at the end of winding, namely when the tape length L=45.7 m, the tape thickness y=0.020 mm and the hub radius H=7.5 mm. The maximum sum is 599,A249(HEX) and a quadruple of the maximum sum is equal to 1666,8924 (HEX).

The quadrupling is used to enhance the difference between the sum of the first cassette and the sum of the second cassette. The quadrupled sum is then applied to the comparator 11. It is theoretically possible to supply the sum calculated by the arithmetic unit 10 to the comparator 11 before being subjected to quadrupling operation, for the comparison with a reference value, described later.

The memory 12 stores, as a reference value or threshold, an intermediate value 1670,000 (HEX) between the quadrupled sum of the first cassette and the quadrupled sum of the second cassette. As appears clear from Table 1, the reference value is smaller than the quadrupled sum supplied from the arithmetic unit 10 to the comparator 11 as long as the first cassette is loaded on the video cassette recorder. In the case of the loading of the second cassette, the reference value is larger than the quadrupled sum. The result of comparison between the output from the arithmetic unit 10 and the reference value stored in the memory 12 makes it possible to judge whether the loading cassette is the first cassette or the second cassette.

The result of judgment by the comparator 11 is supplied to the tension control unit 13 which in turn regulates the speed of the capstan motor 14 and the loading motor 15 so as to control the tape tension depending on the cassette being loaded on the video cassette recorder.

Figure 3:
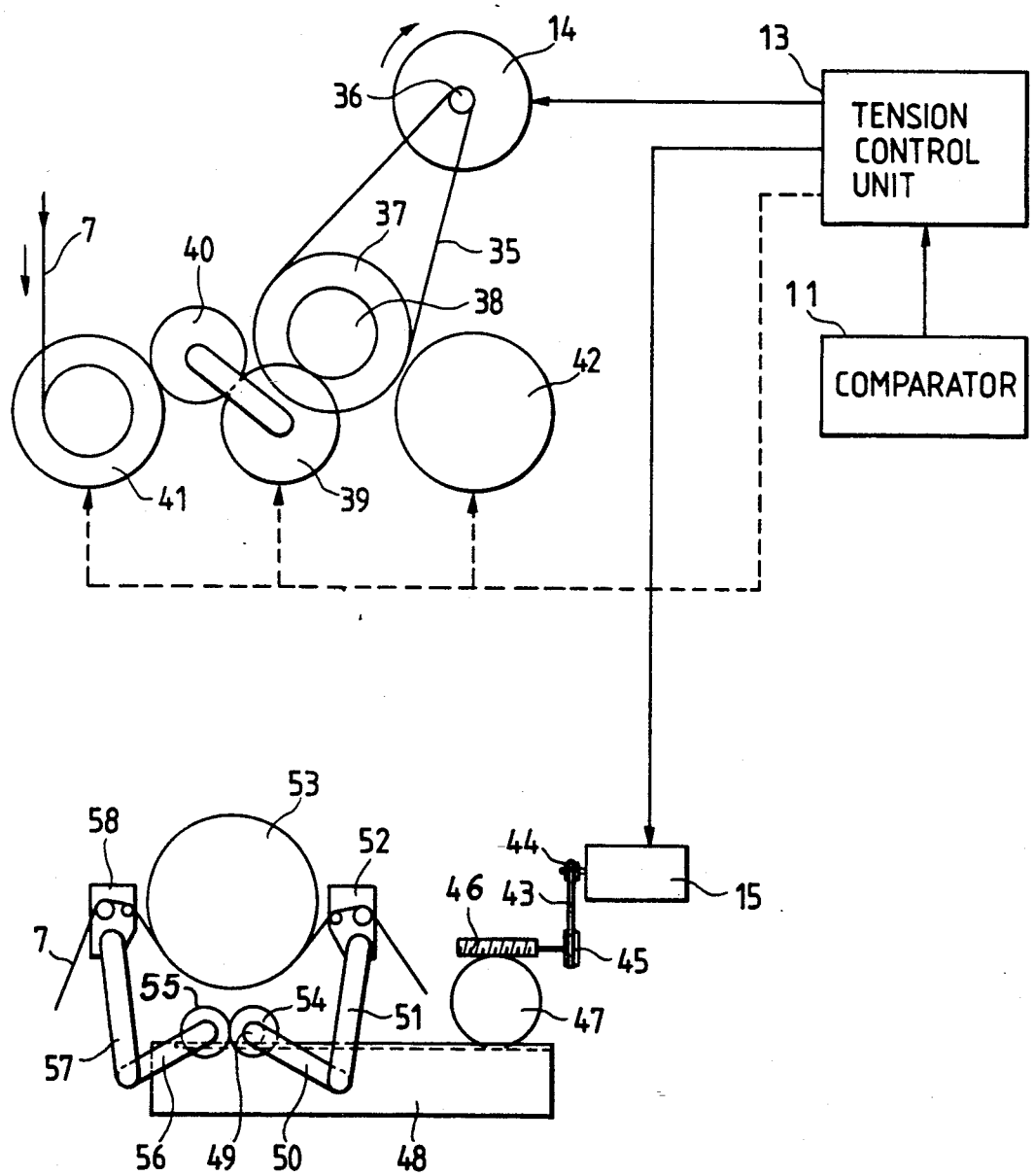
FIG. 3 is a schematic view showing the general construction of a tape tension control mechanism.

As shown in FIG. 3, the capstan motor 14 is operatively connected to a tape travel direction changeover mechanism via a timing belt 35 running over a small sprocket wheel 36 connected to a drive shaft of the capstan motor 14 and a large sprocket wheel 37. The sprocket wheel 37 is journaled coaxially and corotatably with a drive gear 38 which is in mesh with a driven gear 39. The driven gear 39 is linked with an idler gear 40 such that the idler gear 40 is angularly movable on and along the toothed edge of the driven gear 39 between a first position in which the idler gear 40 couples the driven gear 39 and a supply reel drive gear 41 to feed the magnetic tape in the forward direction, and a second position in which the idler gear 40 couples the driven gear 39 and a take-up reel drive gear 42 to feed the magnetic tape in the reverse direction. The idler gear 40 is oscillated between the first and second position to shift the direction of travel of the magnetic tape depending on an operating mode selected by the user. If the supply reel, the idler gear 40 and the take-up reel are directly driven by drive motors, the tension control unit 13 is connected to these drive motors as indicated by the broken lines in FIG. 3, for controlling the operation of the same so as to adjust the tape tension.

The loading motor 15 is operatively connected to a loading mechanism via an endless belt 43 running around a drive pulley 44 fixed to a drive shaft of the loading motor 15 and a driven pulley 45 connected coaxially and corotatably to a worm 46. The worm 46 is drivingly meshed with a control worm wheel 47 which is in turn drivingly meshed with a control rack 48. The control rack 48 meshes with a pinion 49 mounted on one end of a lever 50 which is pivoted at its opposite end to one end of a first loading arm 51. The loading arm 51 supports on its opposite end a first pole base 52 disposed on one side (take-up reel side) of a drum 53 for guiding a portion of the magnetic tape on and around the drum 53. A first actuating gear 54 is mounted on the lever 50 coaxially and corotatably with the pinion 49 and held in mesh with a second actuating gear 55 rotatably mounted on one end of a lever 56. The opposite end of the lever 56 is pivoted to one end of a second loading arm 57 which supports on its opposite end a second pole base 58 disposed on the opposite side (supply reel side) of the drum 53 for guiding the tape part on and around the tension control drum 53. With this construction, when the loading motor 15 is rotated in one direction to move the rack leftwards in FIG. 3, the first and second pole bases 52, 58 move downwardly to thereby release the tape from the drum 53. When the loading motor 15 is rotated in the opposite direction to move the rack rightwards in the same figure, the pole bases 52, 58 move upwardly so that the magnetic tape 7 is forced against the drum 53.

In the case where a cassette being loaded on the video cassette recorder is the second, small cassette, the capstan motor 14 is driven under the control of the tension control unit 13 to wind or rewind the magnetic tape 7 at a speed smaller than the winding speed of the first, large cassette. The lower winding speed provides a considerable reduction of the gear noise. Furthermore, when the direction of travel of the magnetic tape 7 is shifted, the idler gear 40 is oscillated, under the control of the control unit 13, from one position to another at a speed smaller than the speed provided for the first cassette. Thus, the tension on the magnetic tape 7 is reduced to a value appropriate to the thin magnetic tape wound in the second tape cassette. In the loading and unloading modes, the loading motor 15 is controlled by the control unit 13 to slow down the speed of movement of the pole bases 52, 58, thereby protecting the magnetic tape from being subjected to an undue tension.

Obviously various minor changes and modifications of the present invention are possible in the light of the above teaching. It is therefore to be understood that within the scope of the appended claims the invention may be practiced otherwise than as specifically described.

What is claimed is:

1. A magnetic tape recorder of the type wherein a first cassette and an adaptor having the same size as said first cassette and holding therein a second cassette smaller in size than said first cassette are selectively loaded on said magnetic tape recorder, said first cassette including a supply reel and a take-up reel which, respectively, unwind and wind a magnetic tape on and around their hubs, said hubs having a same diameter, said second cassette including a supply reel and a take-up reel which, respectively, unwind and wind a magnetic tape on and around their hubs, said hubs of said second cassette having different diameters, wherein the improvement comprises an apparatus for discriminating between said first cassette and said second cassette, said discriminating apparatus including:

a supply reel drive for rotating the supply reel of said first cassette or the supply reel of said second cassette;

a take-up reel drive for rotating the take-up reel of said first cassette or via drive means the take-up reel of said second cassette;

a capstan for moving the magnetic tape within said first cassette or said second cassette;

a first sensor for detecting the number of revolutions of said supply reel drive and the number of revolutions of said take-up reel drive;

a second sensor for detecting the number of revolutions of said capstan;

an arithemetic unit for computing the sum of a first square of the number of revolutions of said capstan per one revolution of said supply reel drive and a second square of the number of revolutions of said capstan per one revolution of said take-up reel drive, based on the outputs from said first and second sensors, respectively;

a comparator for comparing the output from said arithmetic unit with a predetermined reference value to discriminate between the first cassette and the second cassette; and means for controlling loading and unloading speed of the magnetic tape according to the result of the discrimination by said comparator in such a manner that when the cassette being loaded on said magnetic tape recorder is said second cassette held in said adapter, said loading and unloading speed of the magnetic tape is slower than when the cassette being loaded on said magnetic tape recorder is said first cassette.

2. A magnetic recorder according to claim 1, further including a capstan motor for rotating said capstan, a tape travel direction changeover mechanism driven by said capstan motor, a loading mechanism driven by a loading motor, said means for controlling the loading and unloading speed being operatively connected with said capstan motor and said loading motor for regulating the speed of the same.

* * * * *